(12) United States Patent
Nakane (10) Patent No.: US 11,947,850 B2
(45) Date of Patent: Apr. 2, 2024

(54) SYSTEM, METHOD OF CONTROLLING SYSTEM, IMAGE PROCESSING APPARATUS, AND METHOD OF CONTROLLING IMAGE PROCESSING APPARATUS FOR PERFORMING PRINTING BASED ON SUCCESSFUL VERIFICATION

(71) Applicant: CANON KABUSHIKI KAISHA, Tokyo (JP)

(72) Inventor: Hiroyuki Nakane, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/677,725

(22) Filed: Feb. 22, 2022

(65) Prior Publication Data
US 2022/0276816 A1   Sep. 1, 2022

(30) Foreign Application Priority Data

Feb. 26, 2021  (JP) ................................. 2021-030078
Dec. 10, 2021  (JP) ................................. 2021-200575

(51) Int. Cl.
*G06F 3/12* (2006.01)

(52) U.S. Cl.
CPC .......... *G06F 3/1238* (2013.01); *G06F 3/1222* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 2009/0070864 | A1* | 3/2009 | Nishida | G06F 21/31 726/7 |
| 2010/0321717 | A1* | 12/2010 | Ohba | H04N 1/00954 358/1.14 |
| 2015/0153975 | A1* | 6/2015 | Mori | G06F 3/1222 358/1.14 |
| 2015/0296099 | A1* | 10/2015 | Ferreira | H04N 1/4413 358/1.14 |

FOREIGN PATENT DOCUMENTS

| | | | | |
|---|---|---|---|---|
| CN | 106203054 A | * | 12/2016 | ......... H04L 63/0823 |
| JP | 2015003407 A | | 1/2015 | |

OTHER PUBLICATIONS

English translation of CN-106203054-A. (Year: 2016).*

\* cited by examiner

*Primary Examiner* — Thomas D Lee
(74) *Attorney, Agent, or Firm* — Canon U.S.A., Inc. IP Division

(57) ABSTRACT

A system includes an external apparatus, a server having an authentication function, and an image processing apparatus that communicate with each other via a network. The system performs user authentication in the server, for a user using the system, acquires apparatus information of the external apparatus from a printing request received from the external apparatus, verifies the apparatus information in the server, and executes printing in the image processing apparatus, based on the printing request from an external apparatus corresponding to the successfully verified apparatus information, in a case where the user authentication and the verification for the external apparatus are successful.

19 Claims, 9 Drawing Sheets

| LEVEL | APPLICATION TO BE PERMITTED | CORRESPONDING NETWORK PORT |
|---|---|---|
| 1 | IPP PRINT APPLICATION 1 | HTTPS, IPP(S) |
| 1 | IPPS PRINT APPLICATION 1 | HTTPS, IPP(S) |
| 1 | CLOUD PRINT APPLICATION 1 | HTTPS |
| 1 | ... | |
| 2 | FORCED HOLD PRINT | HTTPS, RAW |
| 2 | ON-PREMISE PRINT APPLICATION 1 | HTTPS, RAW |
| 2 | ... | |
| 3 | DIRECT PRINT | HTTP, LPD |
| 3 | PDL DRIVER PRINT | RAW |
| 3 | ... | |
| 4 | USBD PRINT | ... |
| 4 | USB MEDIUM PRINT | ... |
| 4 | ... | |

SYSTEM, METHOD OF CONTROLLING SYSTEM, IMAGE PROCESSING APPARATUS, AND METHOD OF CONTROLLING IMAGE PROCESSING APPARATUS FOR PERFORMING PRINTING BASED ON SUCCESSFUL VERIFICATION

BACKGROUND

Field of the Disclosure

The present disclosure relates to a system, a method of controlling the system, image processing apparatus, and method of controlling a printing apparatus.

Description of the Related Art

There is known a system in which a firewall is provided between an external network and a corporate network, in order to protect the corporate network and a personal computer as well as a printer connected to the corporate network against attacks and unauthorized access from the external network. This system is a boundary protection model that defends at the boundary such as a firewall against an attack from an external network. In the future, however, due to diversification of the way of working, telework, share offices, satellite offices, and the like are expected to be further widespread, and thus people and devices are expected to disperse. Thus, it will be difficult to protect personal computers and printers, using the boundary protection model. It is therefore desired to employ a zero trust security model in which each defends without trusting the boundary such as a firewall.

Japanese Patent Application Laid-Open No. 2015-3407 discusses a technique as an example of such a model. In this technique, a security policy is set beforehand in a printing apparatus, whether a received print job is compliant with the security policy is verified, and the execution of the print job is restricted if the print job is not compliant with the security policy.

SUMMARY

According to embodiments of the present disclosure, a printing apparatus communicates with an external apparatus via a network, and includes an authentication unit that authenticates the external apparatus, a reception unit that receives a printing request from the external apparatus, and a printing unit that performs printing, based on the printing request from an external apparatus successfully authenticated by the authentication unit.

Further features of the present disclosure will become apparent from the following description of exemplary embodiments with reference to the attached drawings.

DESCRIPTION OF THE EMBODIMENTS

A printing apparatus according to an exemplary embodiment of the present disclosure will be described below with reference to the drawings. In the following exemplary embodiment, a multifunction peripheral (MFP, or digital MFP) having a network cooperation function will be described as an example of the printing apparatus. Embodiments of the present disclosure are not limited to the MFP, and are also applicable to a single function peripheral (SFP) as long as the SFP is an apparatus having a network cooperation function.

Figure 1:
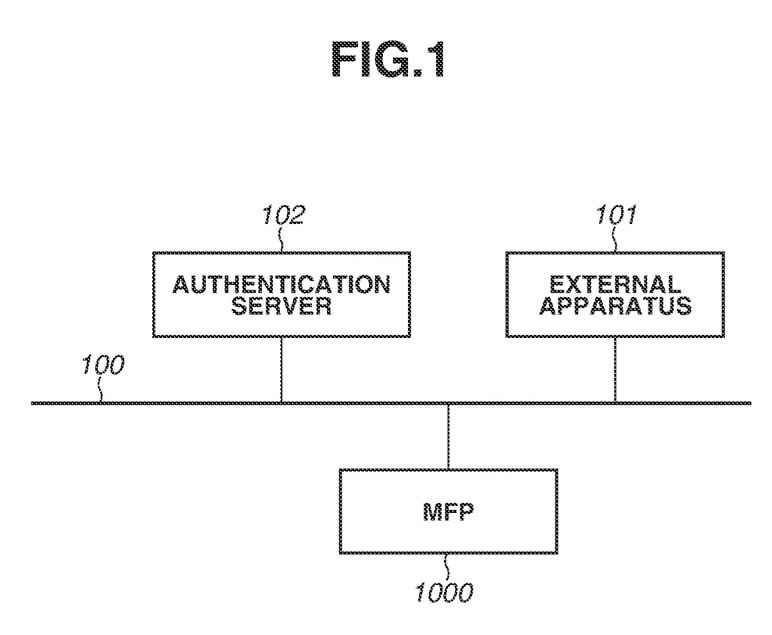
FIG. 1 illustrates a block diagram of a system configuration.

FIG. 1 illustrates a network configuration.

An MFP 1000 having a printing function can transmit and receive, for example, print data, scanned image data, and device management information to and from an external apparatus 101 via a network 100.

The MFP 1000 can also communicate with an authentication server 102 via the network 100. The authentication server 102 can communicate with, for example, a cloud storage, or a file server via the network 100. In FIG. 1, the MFP 1000, the external apparatus 101, and the authentication server 102 are each illustrated as one apparatus, but each or any one of these may be provided as a plurality of apparatuses. The authentication server 102 is configured as an apparatus separate from the MFP 1000, but may be included in the MFP 1000 or the external apparatus 101.

Figure 2A:
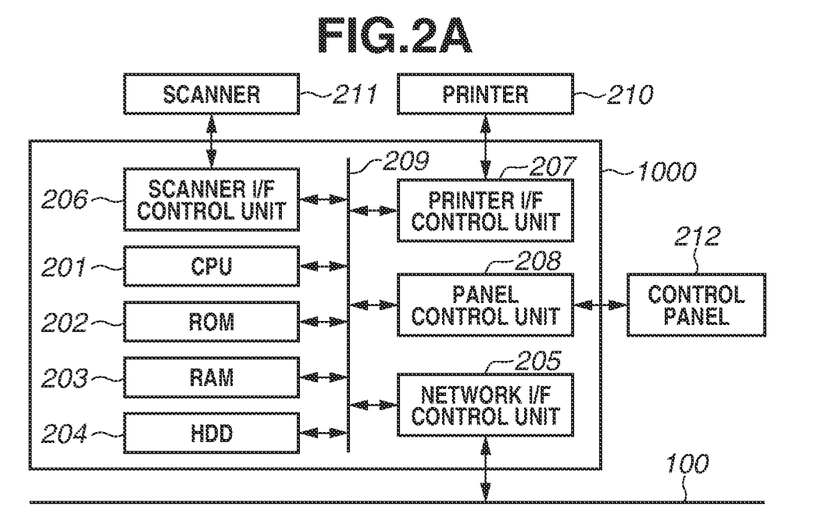
FIGS. 2A, 2B, and 2C each illustrate a block diagram of a hardware configuration.

FIG. 2A is a block diagram illustrating a schematic configuration of the MFP 1000. A central processing unit (CPU) 201 executes a software program of the MFP 1000, and controls the entire apparatus. A read only memory (ROM) 202 stores, for example, a boot program, and fixed parameters of the MFP 1000. A random access memory (RAM) 203 is used to store a program and temporary data when the CPU 201 executes the software program.

A hard disk drive (HDD) 204 stores system software, applications, and various data. The CPU 201 executes the boot program stored in the ROM 202, loads a program stored in the HDD 204 into the RAM 203, and executes the loaded program. A network interface (I/F) control unit 205 controls transmission and reception of data to and from the network 100. A scanner I/F control unit 206 controls reading of an original document by a scanner 211. A printer I/F control unit 207 controls, for example, print processing by a printer 210. A panel control unit 208 controls a control panel 212 of touch panel type, and controls display of various kinds of information and input of instructions from a user. A bus 209 interconnects the CPU 201, the ROM 202, the RAM 203, the HDD 204, the network I/F control unit 205, the scanner I/F control unit 206, the printer I/F control unit 207, and the panel control unit 208 to enable communications among these devices. The CPU 201 transmits and receives signals including control signals and data signals between the devices, to and from the device connected to the bus 209, via the bus 209.

Figure 2B:
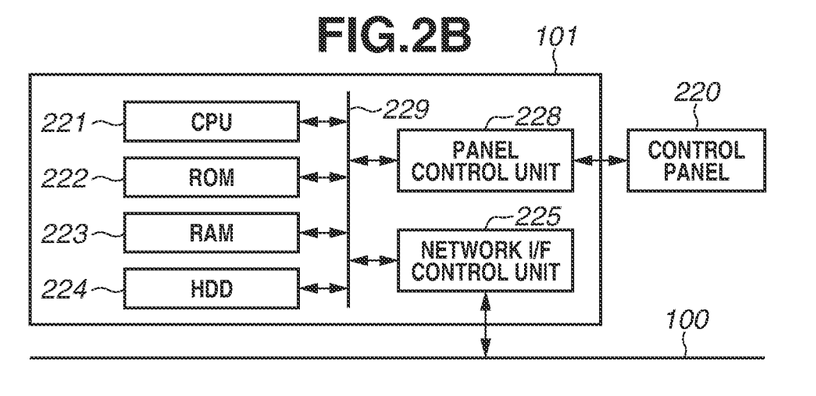

FIG. 2B is a block diagram illustrating a schematic configuration of the external apparatus 101.

A CPU 221 executes a software program of the external apparatus 101, and controls the entire apparatus. A ROM 222 stores, for example, a boot program, and fixed parameters of the external apparatus 101. A RAM 223 is used to store a program and temporary data when the CPU 221 executes the software program. An HDD 224 stores system software, applications, and various data. The CPU 221 executes the boot program stored in the ROM 222, loads a program stored in the HDD 224 into the RAM 223, and executes the loaded program. A network I/F control unit 225 controls transmission and reception of data to and from the network 100. A panel control unit 228 controls a control panel 220 of touch panel type, and controls display of various kinds of information and input of instructions from a user. In the present exemplary embodiment, the control panel 220 of touch panel type will be described as an input device, but the input device may be an input/output device such as a keyboard or a mouse. The control panel 220 may be a display without a function as the input device as long as an input device such as a keyboard or a mouse is included. A bus 229 interconnects the CPU 221, the ROM 222, the RAM 223, the HDD 224, the network I/F control unit 225, and the panel control unit 228 to enable communications among these devices. The CPU 221 transmits and receives signals including control signals and data signals between the devices, to and from the device connected to the bus 229, via the bus 229.

Figure 2C:
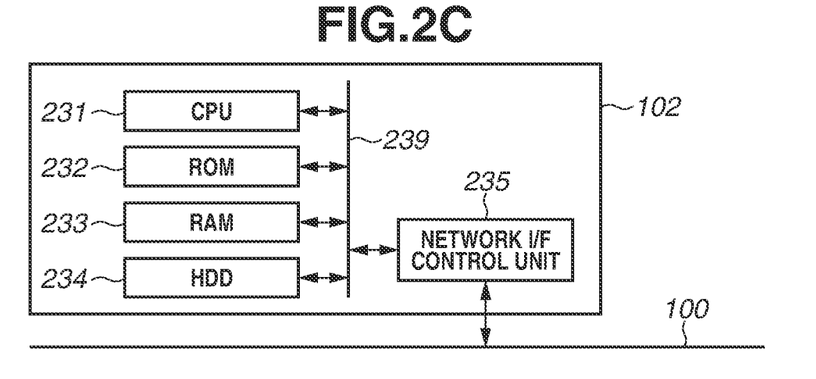

FIG. 2C is a block diagram illustrating a schematic configuration of the authentication server 102.

A CPU 231 executes a software program of the authentication server 102, and controls the entire apparatus. A ROM 232 stores, for example, a boot program, and fixed parameters of the authentication server 102. A RAM 233 is used to store a program and temporary data when the CPU 231 executes the software program. An HDD 234 stores system software, applications, and various data. The HDD 234 also stores authentication database (DB) for managing apparatus information and user authentication information of the MFP 1000 and the external apparatus 101 in association with each other.

The CPU 231 executes the boot program stored in the ROM 232, loads a program stored in the HDD 234 into the RAM 233, and executes the loaded program. A network I/F control unit 235 controls transmission and reception of data to and from the network 100. A bus 239 interconnects the CPU 231, the ROM 232, the RAM 233, the HDD 234, and the network I/F control unit 235 to enable communications among these devices. The CPU 231 transmits and receives signals including control signals and data signals between the devices, to and from the device connected to the bus 239, via the bus 239.

Figure 3A:
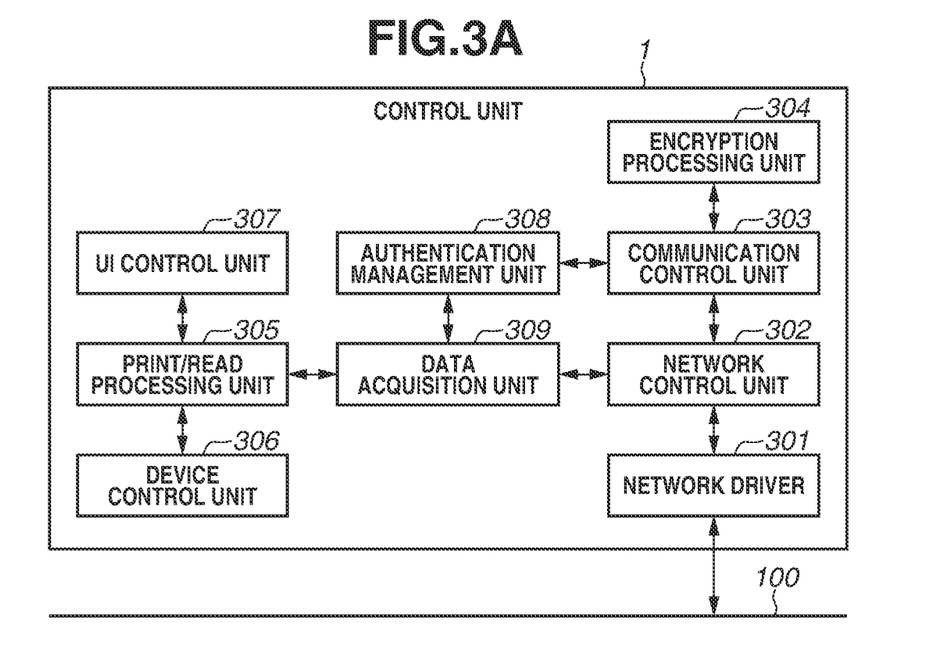
FIGS. 3A, 3B, and 3C each illustrate a block diagram of a software configuration.

FIG. 3A is a block diagram illustrating software modules of the MFP 1000. The CPU 201 executes a program loaded into the RAM 203, thereby implementing the software module illustrated in FIG. 3A.

A network driver 301 transmits and receives data to and from outside via the network 100, by controlling the network I/F control unit 205 connected to the network 100.

A network control unit 302 transmits and receives data, by controlling communication at a transport layer or a layer lower than the transport layer in a network communication protocol of Transmission Control Protocol/Internet Protocol (TCP/IP) or the like.

A communication control unit 303 is a module for controlling a plurality of communication protocols supported by the MFP 1000. The communication control unit 303 opens and closes a network port for using the network communication protocol, for the network control unit 302.

In the present exemplary embodiment, communication using a Hypertext Transfer Protocol Secure (HTTPS) port will be described as an example of this network communication, but encryption communication based on Transfer Layer Security (TLS) or the like supported by the MFP 1000 is also executed by the communication control unit 303.

An encryption processing unit 304 is a module for executing various types of encryption processing, such as data encryption and decryption processing, generation/verification of electronic signature, and hash value generation. The encryption processing unit 304 performs the encryption processing, also in the encryption communication processing based on TLS or the like executed by the communication control unit 303.

A print/read processing unit 305 is a module for executing functions, such as printing by the printer 210 and reading of an original document by the scanner 211. A device control unit 306 is a module for comprehensively controlling the MFP 1000, by generating control commands and control data of the MFP 1000. The MFP 1000 can be instructed to perform each of scanning and printing, based on an instruction given by a user via the control panel 212. A user interface (UI) control unit 307 controls the control panel 212 and the panel control unit 208.

An authentication management unit 308 is a module for performing authentication processing for the external apparatus 101 communicating with the communication control unit 303 via the network 100. In response to a command (e.g., for page description language (PDL) printing) from outside, the authentication management unit 308 provides connection destination information of the external apparatus 101 and data to be acquired, to a data acquisition unit 309 described below. The data acquisition unit 309 acquires a data acquisition command including a job type and the connection destination information, from the authentication management unit 308.

The data acquisition unit 309 is a module for acquiring data from the external apparatus 101 communicating with the communication control unit 303 via the network 100. In the present exemplary embodiment, network ports except for a predetermined network port can be closed, and therefore the data acquisition unit 309 acquires data for control and generates a job, by accessing the external apparatus 101 based on the information provided by the authentication management unit 308. A control unit consisting of the above-described software configuration of the MFP 1000 illustrated in FIG. 3A will hereinafter be referred to as a control unit 1. The control unit 1 includes the CPU 201, the ROM 202, the RAM 203, and the HDD 204 of the MFP 1000. In a sequence and a flowchart to be described below, a part to be processed by the MFP 1000 is stored in any storage unit of the ROM 202, the RAM 203, and the HDD 204 of the control unit 1, and executed by the CPU 201.

Figure 3B:
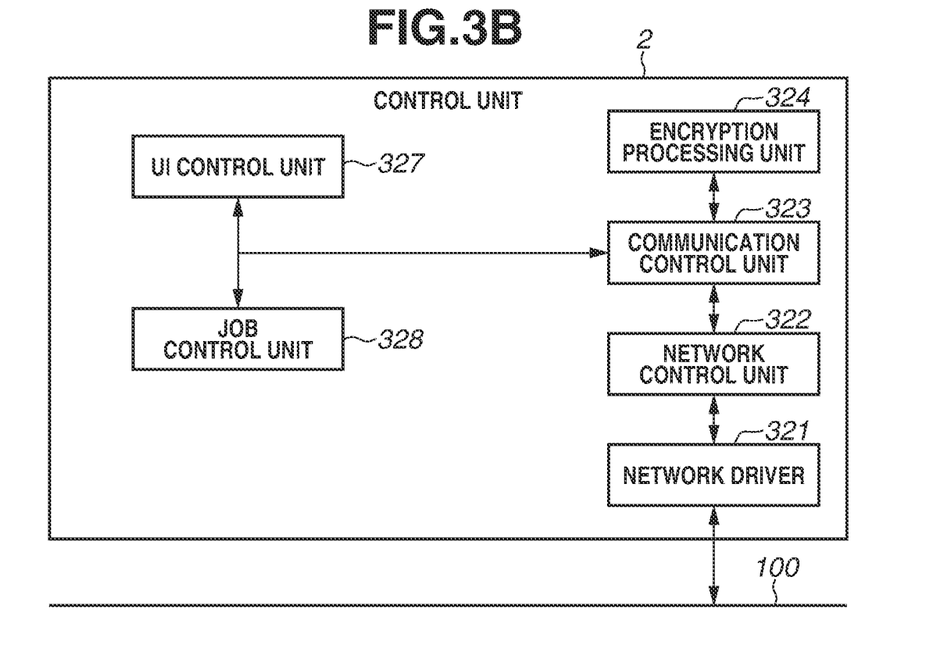

FIG. 3B is a block diagram illustrating software modules of the external apparatus 101. The CPU 221 executes a program loaded into the RAM 223, thereby implementing the software module illustrated in FIG. 3B.

A network driver 321 controls the network I/F control unit 225 connected to the network 100, thereby transmitting and receiving data to and from outside via the network 100.

A network control unit 322 controls communication at a transport layer or a layer lower than the transport layer in a network communication protocol of the TCP/IP or the like, thereby transmitting and receiving data.

A communication control unit 323 is a module for controlling a plurality of communication protocols supported by the external apparatus 101. The communication control unit 323 also executes encryption communication based on TLS or the like supported by the external apparatus 101.

An encryption processing unit 324 is a module for executing various types of encryption processing, such as data encryption and decryption processing, generation/verification of electronic signature, and hash value generation. The encryption processing unit 324 performs the encryption processing, even in the encryption communication processing based on TLS or the like executed by the communication control unit 323.

A UI control unit 327 controls the control panel 220 and the panel control unit 228. A job control unit 328 generates a job in response to an input from the UI control unit 327, and transmits a job to other external apparatus or MFP via the network 100.

A control unit consisting of the above-described software configuration of the external apparatus 101 illustrated in FIG. 3B will hereinafter be referred to as a control unit 2. In the present specification, the control unit 2 includes the CPU 221, the ROM 222, the RAM 223, and the HDD 224 of the external apparatus 101. In the sequence and the flowchart to be described below, a part to be processed by the external apparatus 101 is stored in any storage unit of the ROM 222, the RAM 223, and the HDD 224 of the control unit 2, and executed by the CPU 221.

Figure 3C:
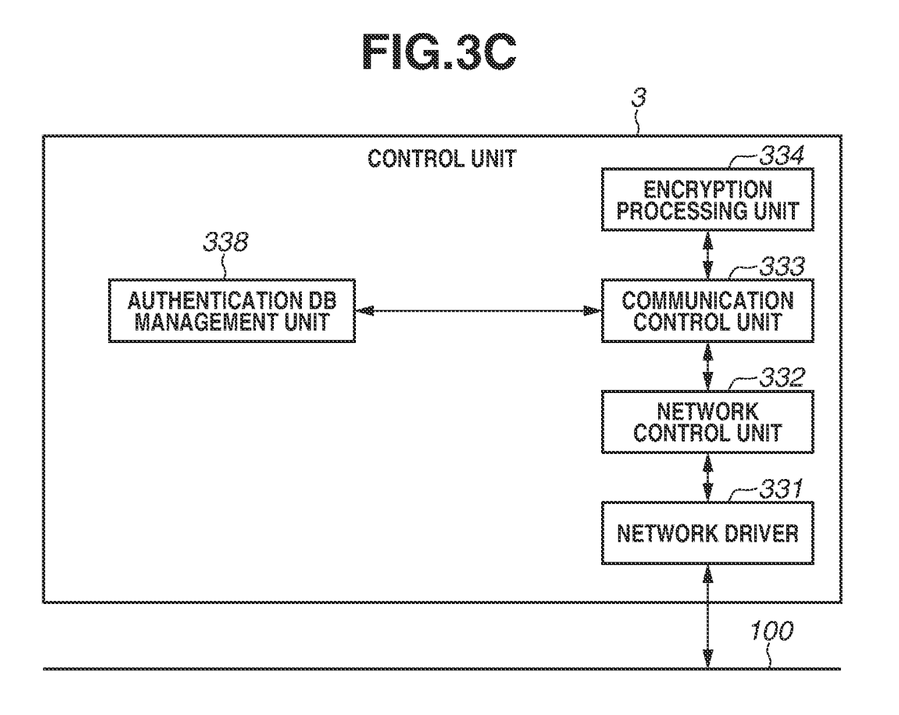

FIG. 3C is a block diagram illustrating software modules of the authentication server 102. The CPU 231 executes a program loaded into the RAM 233, thereby implementing the software module illustrated in FIG. 3C.

A network driver 331 transmits and receives data to and from outside via the network 100, by controlling the network I/F control unit 235 connected to the network 100.

A network control unit 332 controls communication at a transport layer or a layer lower than the transport layer in a network communication protocol of the TCP/IP or the like, thereby transmitting and receiving data. A communication control unit 333 is a module for controlling a plurality of communication protocols supported by the authentication server 102. The communication control unit 333 also executes encryption communication based on TLS or the like supported by the authentication server 102. An encryption processing unit 334 is a module for executing various types of encryption processing, such as data encryption and decryption processing, generation/verification of electronic signature, and hash value generation. The encryption processing unit 334 executes the encryption processing, even in the encryption communication processing based on TLS or the like executed by the communication control unit 333. An authentication DB management unit 338 is a module for performing issuing, management, and inquiry of each digital certificate for other external apparatus or MFP connected via the network 100, and further, for managing a database of various kinds of user authentication information, such as a user identification (ID) and a password of each user. In the present exemplary embodiment, information about the MFP 1000, the external apparatus 101, and a user who executes printing is registered beforehand in the authentication server 102, and each of the MFP 1000 and the external apparatus 101 holds a digital certificate issued at the time of the registration. In the present exemplary embodiment, an example in which the digital certificate is used as an apparatus authentication means will be described, but there may be used a means of registering information unique to each apparatus, such as a media access control (MAC) address, an IP address, and an individual identification number (serial ID), in the authentication server 102 beforehand, and authenticating each apparatus when the apparatus is used.

A control unit consisting of the above-described software configuration of the authentication server 102 illustrated in FIG. 3C will be hereinafter referred to as a control unit 3. In the present specification, the control unit 3 includes the CPU 231, the ROM 232, the RAM 233, and the HDD 234 of the authentication server 102. In the sequence and the flowchart described below, a part to be processed by the authentication server 102 is stored in any storage unit of the ROM 232, the RAM 233, and the HDD 234 of the control unit 3, and executed by the CPU 231.

Figure 4:
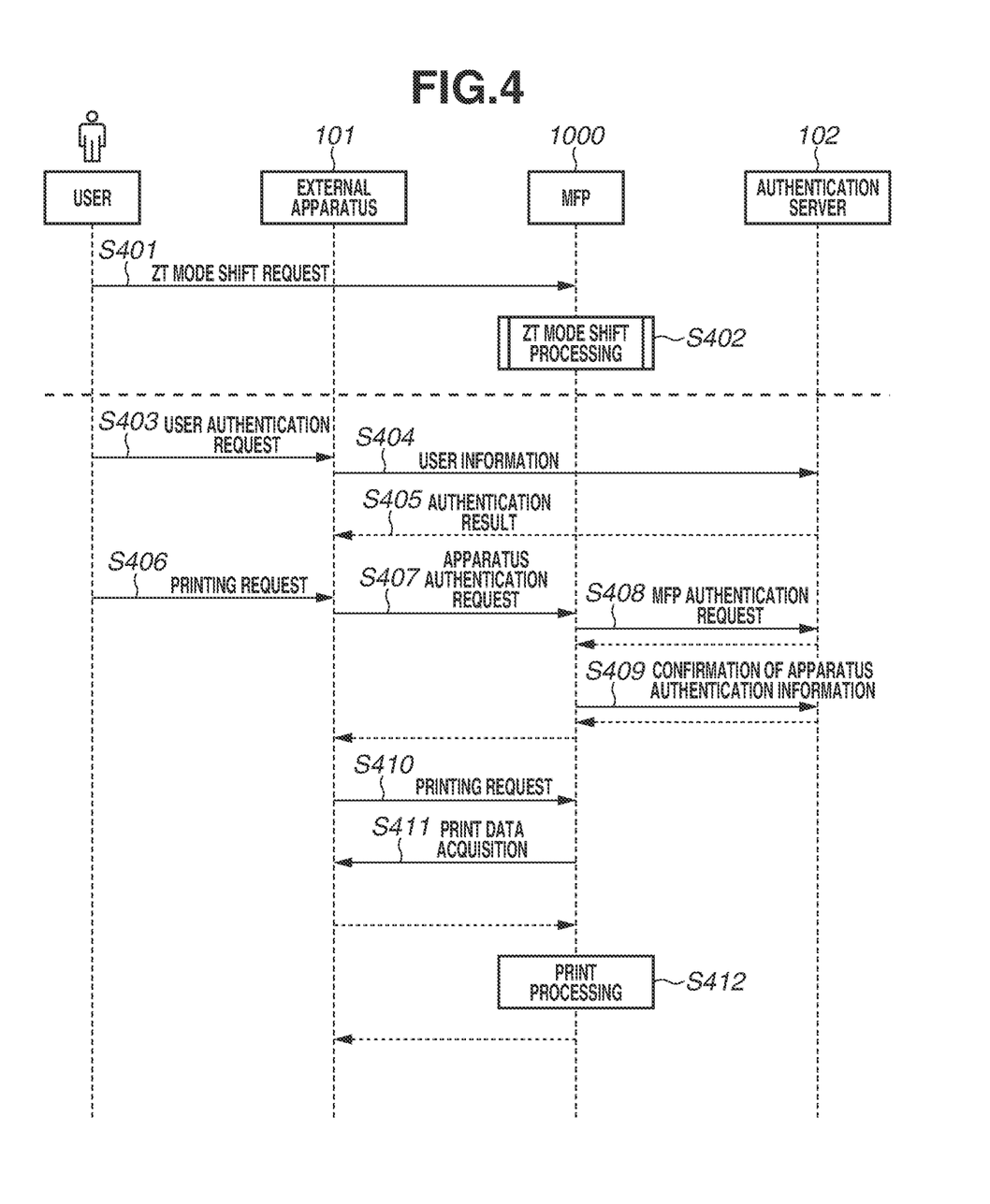
FIG. 4 illustrates a sequence diagram employed in a multifunction peripheral (MFP), an external apparatus, and an authentication server, according to an exemplary embodiment.

The MFP 1000 can shift to a mode (hereinafter referred to as a zero trust (ZT) mode) for forcibly closing one or a plurality of network ports. FIG. 4 is a diagram illustrating a sequence of print processing in the ZT mode. Each sequence used in the MFP 1000 is stored in any storage unit of the ROM 202, the RAM 203, and the HDD 204 of the control unit 1, and executed by the CPU 201. Each sequence in the external apparatus 101 is stored in any storage of the ROM 222, the RAM 223, and the HDD 224 of the control unit 2, and executed by the CPU 221. Each sequence in the authentication server 102 is stored in any storage of the ROM 232, the RAM 233, and the HDD 234 of the control unit 3, and executed by the CPU 231. When it is not in the ZT mode, steps S403 to S405 and steps S407 to S409 are not performed, and print processing in step S412 is performed with steps S406, S410, and S411.

The ZT mode used in the present exemplary embodiment is one of the functions of the MFP 1000, which is a function of forcibly closing one or a plurality of network ports, and accepting only data from an external apparatus for which security is guaranteed beforehand by a Security Socket Layer or SSL (TLS) certificate. The ZT mode used in the present exemplary embodiment is an example of a security mode. A case where there is no permitted network port (all network ports are closed) is the most secured state, and the MFP 1000 provides a local copy function. In the present exemplary embodiment, the HTTPS port will be described as an example of the predetermined network port not closed in the ZT mode.

In step S401, a user makes a request for ZT mode shift processing to shift to the ZT mode to the MFP 1000. The user may directly make the request to the MFP 100, or may make the request to the MFP 1000 via the external apparatus 101. The details of the ZT mode shift processing to be executed in step S402 based on the request in step S401 will be described below.

In step S403, the user makes a user authentication request to a printing system including the MFP 1000 and the authentication server 102, via the external apparatus 101. Specifically, the user makes such a request on the external apparatus 101, during capability response exchange between a printer driver and the MFP 1000. Typically, the printer driver acquires, for example, information about functions or consumable items, and error information of the MFP 1000 from the MFP 1000 via the network, and generates a screen based on capabilities of the MFP 1000. The user authentication request is also made during such a capability response exchange. Here, the external apparatus 101 communicates with the MFP 1000 (the communication is not illustrated), and receives information about whether shifting to the ZT mode is taking place. The external apparatus 101 receives the user authentication request from the user. In step S404, the external apparatus 101 notifies the authentication server 102 of a user ID and a password received as user information in response to the request. In the present exemplary embodiment, a fixed password scheme of matching a user ID and a password will be described as a user authentication means, but user authentication based on a one-time password scheme such as the S/Key scheme or SecurID scheme may be used. In a case where the one-time password scheme is used, a step of issuing a one-time password (from the authentication server 102 to the external apparatus 101) and a step of providing an input (from the external apparatus 101 to the authentication server 102) are further performed between the external apparatus 101 and the authentication server 102 after step S404. In step S405, an inquiry to the authentication management DB (not illustrated) is made in the authentication server 102, and the authentication server 102 replies the result of the inquiry to the external apparatus 101, so that the external apparatus 101 shifts to a user logon state. Upon entering the user logon state, the external apparatus 101 enables operations by the user in a logon period.

In step S406, the user makes a printing request for printing using the MFP 1000 to the external apparatus 101. Making the printing request is an action performed by the external apparatus 101, and therefore, the user can perform such an operation in the logon period started by step S405. In step S407, the external apparatus 101 makes an apparatus authentication request for accessing the MFP 1000 to perform printing. For the apparatus authentication request, a digital certificate of the external apparatus 101 is transmitted beforehand to the authentication server 102, the digital certificate being issued when the external apparatus 101 is registered. The MFP 1000 makes an inquiry to the authentication server 102 about whether the received apparatus authentication request is from the external apparatus 101 that is reliable. In step S408, the MFP 1000 previously notifies the authentication server 102 of an MFP authentication request, in order to access the authentication server 102 for authentication of the MFP 1000. In the MFP authentication request, the digital certificate of the MFP 1000 issued when the MFP 1000 is registered beforehand in the authentication server 102 is transmitted. The authentication server 102 verifies the received digital certificate of the MFP 1000, and replies the result of the verification to the MFP 1000. If the authentication of the MFP 1000 is successful, subsequently in step S409, the MFP 1000 requests the authentication server 102 to provide a public key for verifying the digital certificate of the external apparatus 101 received with the apparatus authentication request of the external apparatus 101. The authentication server 102 replies a digital certificate of the authentication server 102 to the MFP 1000. The digital certificate of the authentication server 102 may be stored beforehand in the MFP 1000. Afterward, the MFP 1000 verifies the digital certificate of the external apparatus 101, using the public key acquired from the received digital certificate of the authentication server 102, and replies the result of the verification, as the result of the authentication performed in response to the apparatus authentication request. It is not necessary to perform such an apparatus authentication sequence from steps S407 to S409, for every printing request. In a case where the authentication of each of the external apparatus 101 and the MFP 1000 is performed beforehand via the authentication server 102 (in a case of the second and subsequent printing in this apparatus configuration), these steps may be omitted.

In step S410, after the external apparatus 101 is successfully authenticated, the external apparatus 101 makes a printing request to the MFP 1000. The printing request in step S410 may be made before the apparatus authentication request performed in step S407. In such a case, the processing in steps S407 to S409 is performed only for the first printing request. In step S411, in response to the printing request, the MFP 1000 acquires print data and attribute information thereof from the external apparatus 101, as a print job. In step S412, the MFP 1000 executes the print processing based on the acquired print job. The MFP 1000 executes the print processing, based on the printing request from the external apparatus 101 successfully authenticated.

Next, the details of the ZT mode shift processing in step S402 will be described. This step begins in response to the ZT mode shift request made to the MFP 1000 by the user. An example in which the ZT mode shift request is set by the user in a remote UI for accessing the MFP 1000 from the web browser of the external apparatus via the network will be described. The ZT mode shift request may be set in a local UI displayed on the control panel 212 of touch panel type.

Figure 5:
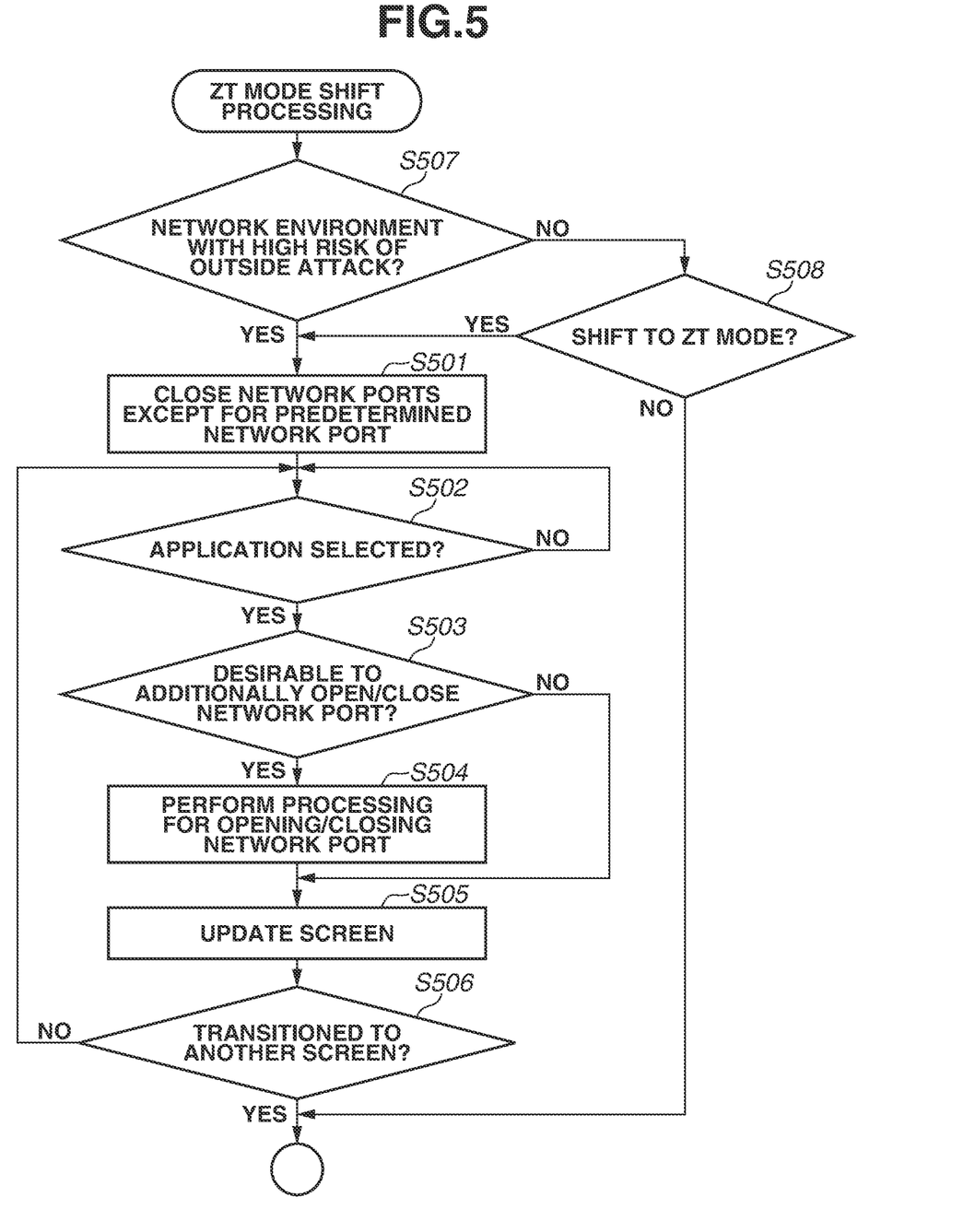
FIG. 5 is a flowchart illustrating zero trust (ZT) mode shift processing.
Figure 6:
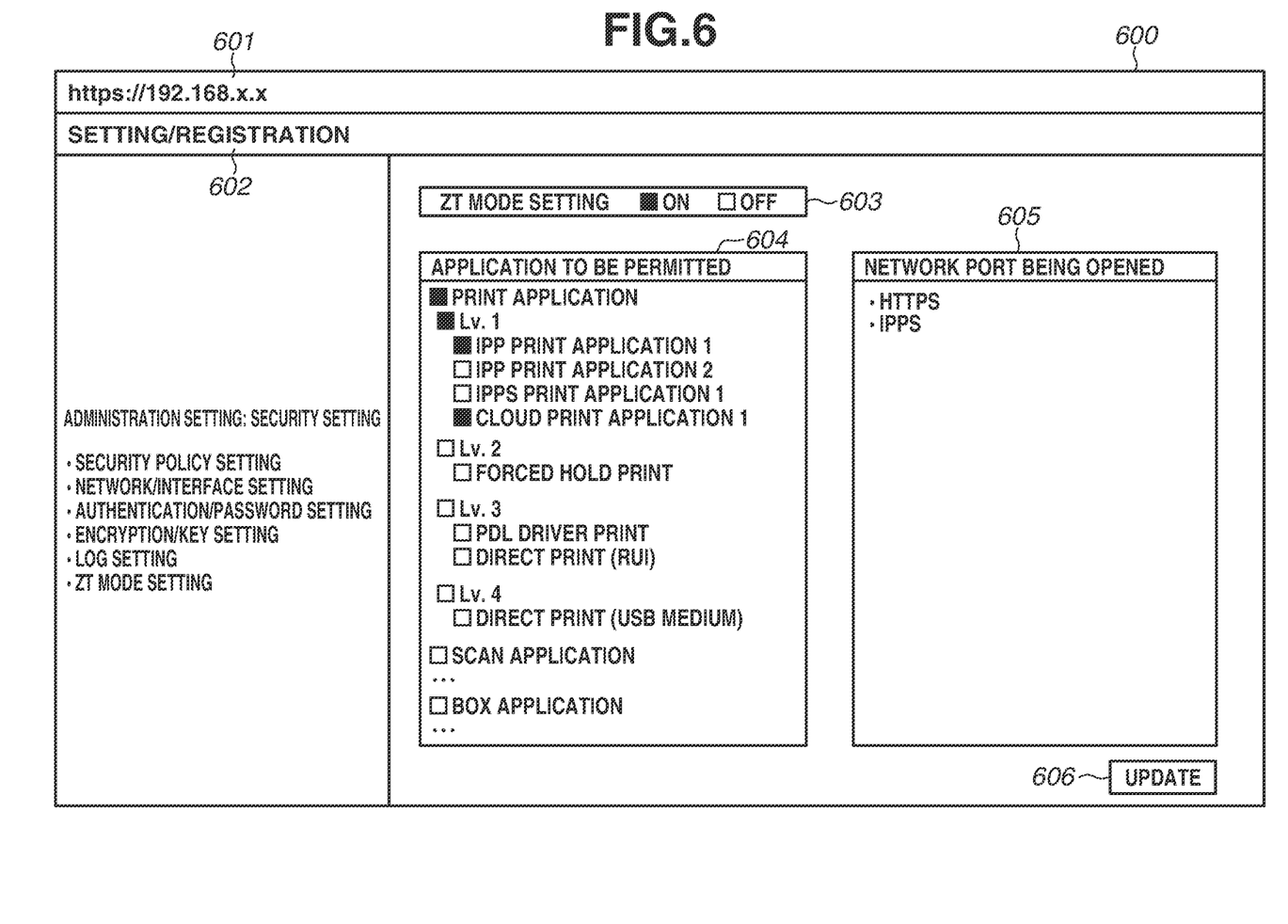
FIG. 6 illustrates a screen example displayed when port setting is performed application by application in the ZT mode.

FIG. 6 is a diagram illustrating a screen 600 on a web browser of a personal computer (PC) connected to the MFP 1000. The screen 600 displays hypertext markup language (HTML) data acquired from the MFP 1000 by input of the IP address of the MFP 1000 by the user in an address bar 601 on the screen 600 on the web browser. The screen 600 displays a window 602 for an administrator to change or store setting values of the MFP 1000, and, in this window, setting related to the ZT mode can be made as one of security settings for the administrator. A ZT mode setting selection area 603 is an area for changing the setting for the ZT mode by selecting a check box ON or OFF. Selecting the check box ON triggers shifting to the ZT mode, and the MFP 1000 shifts to the ZT mode. The details of the ZT mode shift processing in the MFP 1000 will be described with reference to a flowchart in FIG. 5.

In step S507, in response to the ZT mode shift request from the UI control unit 307, the communication control unit 303 confirms the security state of the network environment where the MFP 1000 is installed, and determines whether the network environment is a location with a high risk of outside attack. If the communication control unit 303 determines that the network environment is a location with a high risk of outside attack (YES in step S507), the processing proceeds to step 501. Otherwise (NO in step S507), the processing proceeds to step S508. In the determination of a location with a high risk of outside attack, the communication control unit 303 confirms the presence/absence of a firewall within the same network, and determines that the network environment is a protected corporate network environment in a case where the firewall is present. In another example, the communication control unit 303 may determine that a risk of outside attack is high, in a case where a specific server (not illustrated) that communicates based on a non-secure protocol is provided outside the network, and the MFP 1000 can communicate with the specific server.

If the communication control unit 303 determines that a risk of outside attack is not high (NO in step S507), the processing proceeds to step S508. In step S508, the communication control unit 303 determines whether to shift to the ZT mode by displaying information asking the same via the UI control unit 307. In a case where the ZT mode shift request arrives from the UI control unit 307 based on a user operation (YES in in step S508), the processing proceeds to step S501. Otherwise (NO in step S508), this flow ends.

In step S501, the communication control unit 303 closes the network ports except for the HTTPS port for the network control unit 302, in response to the ZT mode shift request from the UI control unit 307. In the MFP 1000, the communication protocols except for that of the HTTPS port in the transport layer are limited through this flow, so that the MFP 1000 can be protected against threats even if the MFP 1000 receives data from outside.

An application selection area 604 is an area for selecting a function that uses network communication of the MFP 1000 to permit the use of the selected function. The functions that use network communication include a print application, a scan application, and a box (the entire storage inside and outside the MFP) application. The ZT mode can provide protection against the threat of attacks from outside, but available functions are limited in the state where the network ports except for the HTTPS port are closed. Thus, the use is permitted in stages for each application, depending on the communication protocol and the external apparatus to be the connection destination. In the present exemplary embodiment, a case where the print applications are classified into four levels 1 to 4 (Lv. 1 to Lv. 4) depending on the reliability with respect to the external apparatus to be the connection destination and the safety of the communication protocol to be used will be described with reference to FIG. 7.

Figure 7:
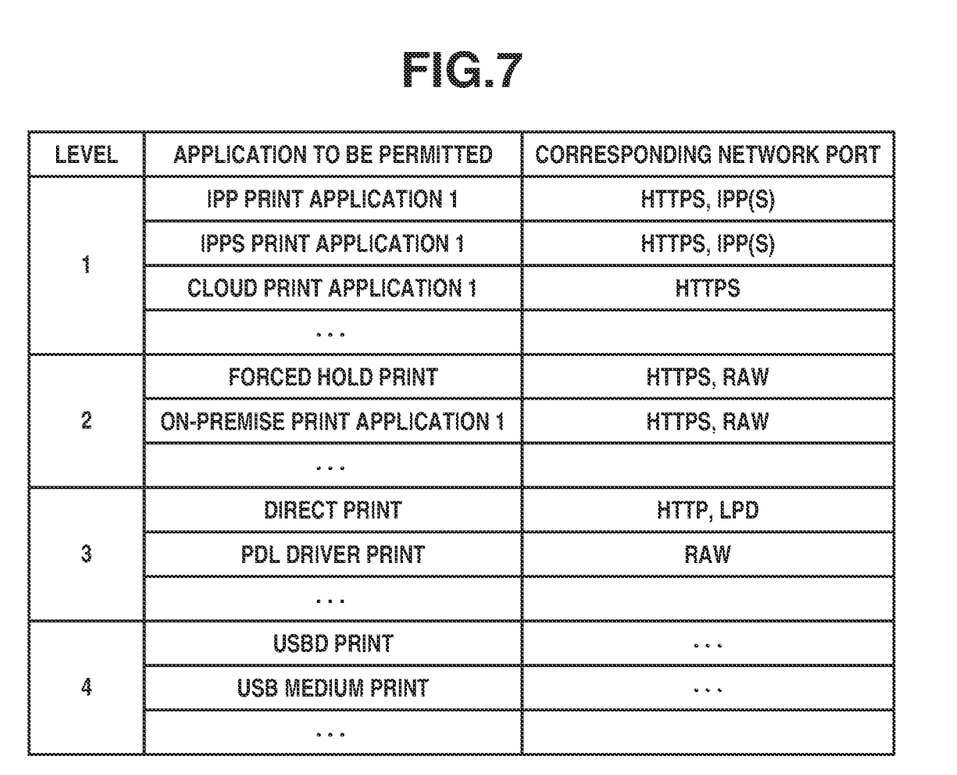
FIG. 7 illustrates a table indicating the correspondence between a print application and a port.

FIG. 7 illustrates a table in which applications are categorized into print paths so that a more secure print application is selected according to the level.

Applications permitted at the level 1 are print applications based on Internet Printing Protocol (IPP) or IPP over SSL/TLS (IPPS) provided by an operating system (OS) of an external apparatus as a standard function, or IPP-Infra specification based on IPP. The applications also include print applications provided by the MFP 1000 and an authenticated cloud. In a case where these functions are enabled, an IPP port or IPPS port is opened in addition to the HTTPS port.

Applications permitted at the level 2 are print applications implemented within office security including an office, an in-house cloud, and an on-premise server. Specifically, the applications permitted at the level 2 include a forced hold print application for holding print data in a PC or in-house cloud and printing the print data, and an on-premise print application for operating an on-premise server and an MFP as a set. In a case where such functions are enabled, a RAW port is additionally opened. In general, a RAW protocol is a non-secure printing protocol, but the security thereof is ensured by the office security.

Applications permitted at the level 3 are print applications implemented directly by an MFP and a PC via a network. Examples of these applications include an application for driver print of feeding binary data generated from a PC via a printer driver. The applications also include an application for direct print of feeding Portable Document Format (PDF) data or Extensible Markup Language Paper Specification (XPS) data, using a Line Printer Remote (LPR) command.

In a case where such functions are enabled, a Line Printer Daemon (LPD) port is additionally opened. The LPD protocol is also a non-secure print protocol as with the RAW protocol, but the security thereof depends on an environment where an MFP is installed.

Applications permitted at the level 4 are print applications for directly connecting an MFP and an apparatus to perform printing, such as applications for Universal Serial Bus (USB) device and USB host. These applications are applications to be used in a print mode in which a user directly connects an MFP and the user's own PC or a USB flash memory, and therefore, an administrator of the MFP permits each of these applications depending on the use thereof.

In step S502, the communication control unit 303 detects whether an application is selected by the user, e.g., whether an IPP application 1 and a cloud print application 1 at the print application Lv. 1 are selected by the user, based on the press of an update button 606. In step S503, the communication control unit 303 compares a network port using the selected application and a network port currently opened, and determines whether there is a network port to be additionally opened. Alternatively, in step S503, the communication control unit 303 determines whether there is a network port that can be closed in a network port list for a continuously selected application, in a case where the selection of an application is cancelled. If it is not desirable to additionally open or close a network port (NO in step S503), the processing proceeds to step S505. If it is desirable to additionally open or close a network port (YES in step S503), the processing proceeds to step S504.

In the present exemplary embodiment, the case where the above-described two applications are selected immediately after shifting to the ZT mode (only the HTTPS port is opened) is described, and therefore, the communication control unit 303 determines that it is desirable to open the IPPS port to be used for IPP printing. Subsequently, the communication control unit 303 requests the network control unit 302 to open the IPPS port. In step S504, the network control unit 302 performs processing for opening/closing for the IPPS port. In step S505, upon completion of the opening/closing processing, the communication control unit 303 updates the displayed screen to display the currently opened network port in an area 605 for displaying a network port being opened. In step S506, upon updating the displayed screen, the communication control unit 303 determines whether the screen has transitioned to another screen. If the screen has not transitioned to another screen (NO in step S506), the processing returns to step S502 and waits for selection of another application, as long as no transition to another screen occurs and the web browser is not closed without selection of another application. If the screen has transitioned to another screen (YES in step S506), the ZT mode shift processing ends.

In printing in the ZT mode, the network ports except for the permitted network port are closed. Thus, the print processing cannot be implemented in a form in which print data and attribute information thereof is transmitted as a print job to a print port (such as the LPD port or the RAW port), as in PUSH-type printing from outside to an MFP. As in the present exemplary embodiment, information except for information that the MFP intends to acquire can be blocked by acquiring information for realizing a request to a reliable authenticated apparatus from the MFP, in response to a request from outside (PULL type). The MFP can therefore be protected from threats such as a harmful outside attack.

In the present exemplary embodiment, there is described the example in which the user decides and selects whether to shift to the ZT mode, and whether to shift to the ZT mode is confirmed based on the selection by the user and further depending on the installation location of the MFP. However, the confirmation can be performed based on either of these. In other words, shifting to the ZT mode may be performed based on only the selection of whether to shift to the ZT mode by the user, or switching the ZT mode setting selection area 603 between display and non-display or switching a default value for setting between ON and OFF may be performed based on the presence/absence of a firewall, depending on the installation location of the MFP. In the case of shifting depending on the installation location of the MFP, the UI control unit 307 can switch the ZT mode setting selection area 603 to non-display, or switch the default value to OFF, if the location where the MFP is installed is determined to be within the firewall.

In the present exemplary embodiment, there is described the example in which the user selects the application from the levels in stages, depending on the reliability with respect to the external apparatus to be the connection destination of the application and the safety of the communication protocol to be used. However, a selectable application displayed by the UI control unit 307 is a PULL-type application that acquires data from the MFP 1000 and transmits the data to the outside. It is possible to demand strict security, by prohibiting selection of or not displaying applications other than an application based on data reception from an authenticated cloud or external apparatus.

Moreover, it is possible to demand stricter security, by permitting application selection in stages depending on authentication strength, for applications based on data reception from an authenticated cloud or external apparatus. Specifically, the authentication management unit 308 determines authentication of each of the MFP 1000 and an external apparatus based on Authenticator Assurance Level (AAL), and the UI control unit 307 displays and allows selection of applications to be permitted in stages from AAL 3 to AAL 1.

As described above, according to the present exemplary embodiment, it is possible to execute the print processing based on a printing request transmitted from an external apparatus, after confirming that the external apparatus is a reliable external apparatus.

In the present exemplary embodiment, there is described the example in which the use is permitted in stages, based on the network port and the external apparatus to be the connection destination of each application, but it is also possible to display a selectable application for each network port. A screen 800 to be displayed in this setting on the web browser of the PC will be described with reference to FIG. 8.

Figure 8:
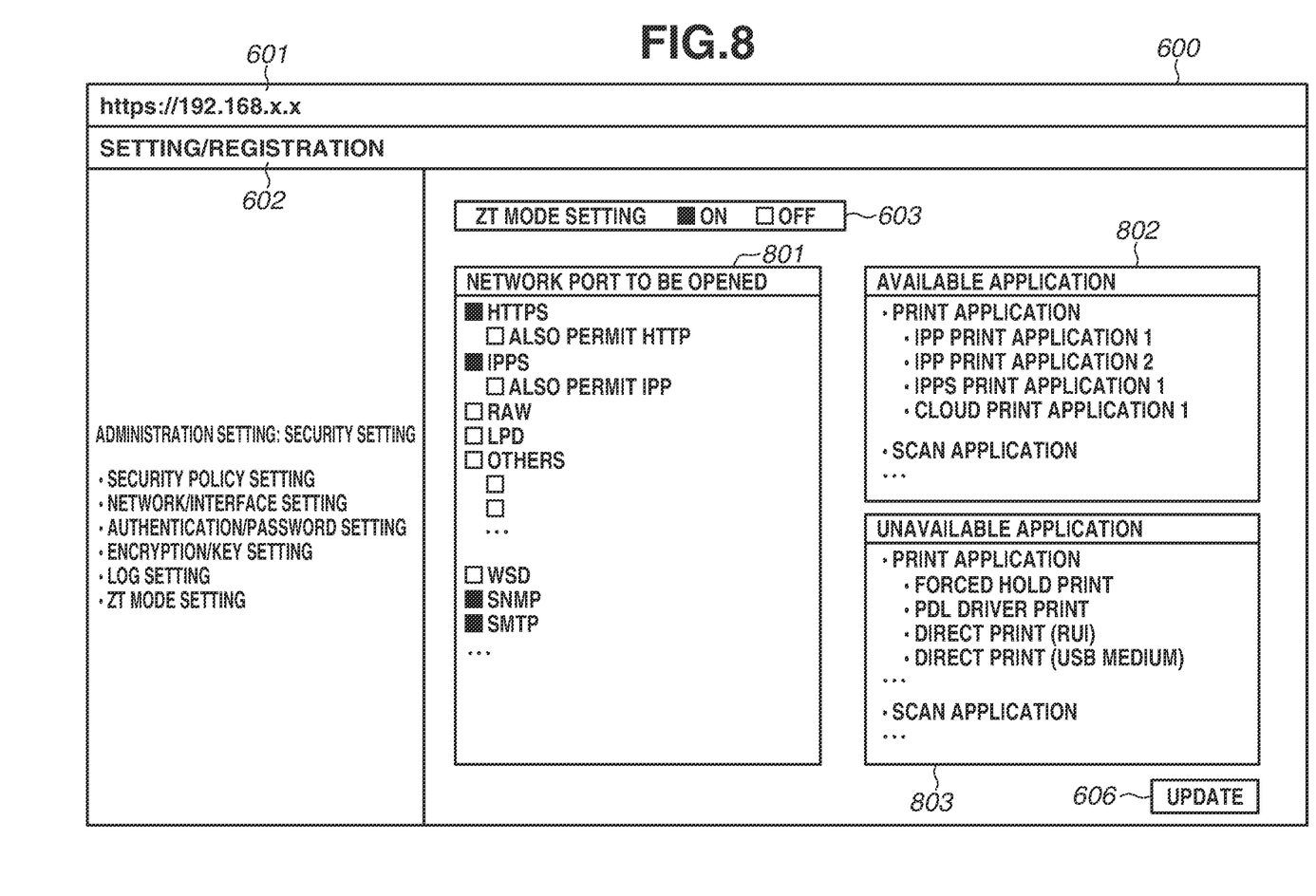
FIG. 8 illustrates a screen example displayed when application setting is performed port by port in the ZT mode.

The areas 601 to 603 (the address bar 601 to the ZT mode setting selection area 603) are described with reference to FIG. 6 and thus will not be described. An area 801 for displaying a network port to be opened displays a network port for an application of the MFP 1000. The UI control unit 307 detects selection of a network port designated by the user to be opened, and the communication control unit 303 displays an application that functions in the selected network port in an available application area 802. In addition, an application that does not function in the network port in this state may be displayed in an unavailable application area 803.

In the present exemplary embodiment, the print application is described, but the MFP 1000 also includes other applications such as a fax application, a (network) storage application, a management application, and a copy application, as network cooperation functions.

Examples of the fax application include G3FAX, personal computer FAX (PCFAX), Internet FAX (IFAX), and Internet protocol FAX (IPFAX). Examples of the storage application include server message block (SMB), a Web distributed authoring and versioning (WebDAV), and File Transfer Protocol (FTP) each serving as a function as a file server to be accessed by (to receive data from) other MFP or a function as a client to access (to transmit data to) other MFP. Examples of the management application include an application of importing and exporting of an address book, and examples of the copying application include an application of cascade copy for performing output from a plurality of MFPs in cooperation with a network. It is needless to say that, as with the print application described in the present exemplary embodiment, these functions can produce similar effects by permitting the use application by application, and opening/closing the network port based on the permission.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-030078, filed Feb. 26, 2021, and No. 2021-200575, filed Dec. 10, 2021, which are hereby incorporated by reference herein in their entirety.

What is claimed is:

1. A system including an external apparatus, a server having an authentication function, and an image processing apparatus that are configured to communicate with each other via a network, the system comprising:
one or more controllers having one or more processors and one or more memories, the one or more controllers configured to function as:
an authentication unit configured to perform user authentication in the server, for a user using the system;
a transmission unit configured to transmit a printing request from the external apparatus to the image processing apparatus; and
a verification unit configured to verify apparatus information of the external apparatus acquired from the printing request in the server,
wherein, in a case where verification of the external apparatus in the verification unit is successful, the image processing apparatus accepts print data via a plurality of network ports of the image processing apparatus, and in a case where authentication in the authentication unit and verification in the verification unit are successful, the image processing apparatus executes printing, based on the printing request from an external apparatus corresponding to the successfully verified apparatus information.

2. The system according to claim 1, wherein the one or more controllers are further configured to function as a setting unit configured to set the system in a predetermined security mode,
wherein, in a case where the system is set in the predetermined security mode, the image processing apparatus executes printing, based on the printing request from the external apparatus corresponding to the successfully verified apparatus information after authentication in the authentication unit and verification in the verification unit are successful.

3. The system according to claim 2, wherein in a case where the system is not set in the predetermined security mode, the image processing apparatus executes printing based on the printing request without performing verification in the verification unit.

4. The system according to claim 2, wherein the predetermined security mode is set via a display of the image processing apparatus.

5. The system according to claim 2, wherein the one or more controllers are further configured to function as a display control unit configured to display a confirmation window for confirming whether to set he predetermined security mode, in a case where an installation environment of the image processing apparatus is not determined as an environment for which setting of the predetermined security mode is desirable.

6. The system according to claim 1, wherein user authentication information for the user authentication is acquired from the user via the external apparatus, and the external apparatus transmits the acquired user authentication information to the server.

7. The system according to claim 1, wherein the one or more controllers are further configured to function as:
a setting unit configured to set the system in a predetermined security mode; and
a control unit configured to control the image processing apparatus to accept only a print job via predetermined one or more network ports among the plurality of network ports, in a case where the system is set in the predetermined security mode.

8. The system according to claim 7, wherein the control unit does not control the image processing apparatus to accept only a print job via the predetermined one or more network ports among the plurality of network ports, in a case where the system is not set in the predetermined security mode.

9. The system according to claim 7, wherein the predetermined security mode is a mode in which only the predetermined one or more network ports among the network ports of the image processing apparatus are enabled to communicate.

10. The system according to claim 7, wherein the predetermined security mode is a mode in which only one or more network ports designated by the user among the network ports of the image processing apparatus are enabled to communicate.

11. The system according to claim 7, wherein the predetermined security mode is a mode in which a print application to be permitted is selected.

12. The system according to claim 11, wherein the one or more controllers are further configured to function as a display control unit configured to display a screen for selecting the print application to be permitted.

13. A method of controlling a system including an external apparatus, a server having an authentication function, and an image processing apparatus that are configured to communicate with each other via a network, the method comprising:
performing user authentication in the server, for a user using the system;
transmitting a printing request from the external apparatus to the image processing apparatus;
performing verification of apparatus information of the external apparatus acquired from the printing request in the server;
accepting print data in the image processing apparatus via a plurality of network ports of the image processing apparatus, in a case where verification of the external apparatus is successful; and
executing printing in the image processing apparatus, based on the printing request from an external apparatus corresponding to the successfully verified apparatus information, in a case where the authentication and the verification are successful.

14. An image processing apparatus configured to communicate with an external apparatus and a server having an authentication function via a network, the image processing apparatus comprising:
one or more processors; and
at least one memory storing instructions, which when executed by the one or more processors, cause the image processing apparatus to:
receive a printing request from the external apparatus;
transmit apparatus information of the external apparatus acquired from the printing request to the server;
accept print data via a plurality of network ports of the image processing apparatus from an external apparatus corresponding to the apparatus information successfully verified in the server; and
print the accepted print data.

15. The image processing apparatus according to claim 14, wherein the instructions, when executed by the one or more processors, further cause the image processing apparatus to:
set the image processing apparatus in a predetermined security mode; and
perform control to accept only a print job via predetermined one or more network ports among the plurality of network ports, in a case where the image processing apparatus is set in the predetermined security mode.

16. The image processing apparatus according to claim 15, wherein the image processing apparatus does not perform control to accept only a print job via the predetermined one or more network ports among the plurality of network ports, in a case where the image processing apparatus is not set in the predetermined security mode.

17. The image processing apparatus according to claim 15, wherein the predetermined security mode is a mode in which only one or more network ports designated by a user among the network ports of the image processing apparatus are enabled to communicate.

18. The image processing apparatus according to claim 15, wherein the predetermined security mode is a mode in which a print application to be permitted is selected.

19. A method of controlling an image processing apparatus configured to communicate with an external apparatus and a server having an authentication function via a network, the method comprising:
- receiving a printing request from the external apparatus;
- transmitting apparatus information of the external apparatus acquired from the printing request to the server;
- accepting print data via a plurality of network ports of the image processing apparatus from an external apparatus corresponding to the apparatus information successfully verified in the server; and
- printing the accepted print data.

* * * * *